US010015317B1

(12) United States Patent
Crouthamel

(10) Patent No.: US 10,015,317 B1
(45) Date of Patent: Jul. 3, 2018

(54) CROSS-PROCESS COMPUTER TELEPHONY INTEGRATION (CTI) CLIENT

(71) Applicant: International Business Machines Corporation, Armonk, NY (US)

(72) Inventor: Kevin V. Crouthamel, Longmont, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/588,671

(22) Filed: May 7, 2017

(51) Int. Cl.
| H04M 3/51 | (2006.01) |
| H04M 3/523 | (2006.01) |
| H04L 29/08 | (2006.01) |
| G06F 3/0484 | (2013.01) |
| G06F 3/0481 | (2013.01) |

(52) U.S. Cl.
CPC ...... H04M 3/5191 (2013.01); G06F 3/04817 (2013.01); G06F 3/04842 (2013.01); H04L 67/146 (2013.01); H04M 3/5166 (2013.01); H04M 3/523 (2013.01); H04M 2203/256 (2013.01); H04M 2203/558 (2013.01)

(58) Field of Classification Search
CPC .. H04M 3/5191; H04M 3/5166; H04M 3/523; H04M 2203/558; H04M 2203/256; H04L 67/146; G06F 3/04842; G06F 3/04817
USPC .................................................. 379/265.02
See application file for complete search history.

(56) References Cited

U.S. PATENT DOCUMENTS

| 7,522,720 | B2 | 4/2009 | Drobek |
| 9,438,712 | B1 * | 9/2016 | Cutajar ............. H04M 3/42068 |
| 2003/0187971 | A1 | 10/2003 | Uliano et al. |
| 2014/0294162 | A1 | 10/2014 | Ervin et al. |

(Continued)

OTHER PUBLICATIONS

Gavin Austin, Open CTI—Say Goodbye to CTI Adapters, Salesforce Developers Blog, Feb. 11, 2013, pp. 1-5, Salesforce.com, Inc. Published at: https://developersalesforce.com/blogs/tech-pubs/2013/02/open-cti%E2%80%94say-goodbye-to-cti-adapters.html.

(Continued)

*Primary Examiner* — Harry S Hong
(74) *Attorney, Agent, or Firm* — Lee Law, PLLC; Christopher B. Lee

(57) ABSTRACT

A computer telephony integration (CTI) client computing device isolates call processing devices from each of a set of back-end business applications of call-center clients for which call-center services are provided. A registered call event is received from a CTI middleware server during active call processing of an incoming telephone call responsive to an interactive voice response (IVR) system storing real-time call data to an independent stand-alone database in association with a unique call-specific database key. The unique call-specific database key is retrieved from the CTI middleware server. A call database record, including the real-time call data, is retrieved from the independent stand-alone database using the unique call-specific database key retrieved from the CTI middleware server. The real-time call data is provided as output to a trusted call center agent that has separate authorization to access a back-end business application appropriate to continue the active call processing.

20 Claims, 6 Drawing Sheets

(56) References Cited

U.S. PATENT DOCUMENTS

2016/0373580 A1* 12/2016 Cutajar ............ H04M 3/42068

OTHER PUBLICATIONS

Author Unknown, Build a custom CTI adapter for Unified Service Desk, Unified Service Desk 2.0, Nov. 29, 2016, pp. 1-2, Microsoft Corporation, Published at: https://msdn.microsoft.com/en-us/library/dn864885.aspx.

Author Unknown, CTI OS Agent Desktop User Guide for cisco Unified ICM/Contact Center Enterprise & Hosted, Jul. 16, 2017, pp. 1-17, Cisco Systems, Inc., Published at: http://www.cisco.com/c/en/us/td/docs/voice_ip_comm/cust_contact/contact_center/ctios/ctios10_0/User/Guide/UCCE_BK_C86A037A_00_ctios-agent-desktop-user-guide/UCCE_BK_C86A037A_00_ctios-agent-desktop-user-guide_chapter_01.html.

* cited by examiner

US 10,015,317 B1

CROSS-PROCESS COMPUTER TELEPHONY INTEGRATION (CTI) CLIENT

BACKGROUND

The present invention relates to computer telephony integration (CTI). More particularly, the present invention relates to a cross-process computer telephony integration (CTI) client.

An interactive voice response (IVR) system at a call center includes voice recognition technology that interacts with callers to perform automated gathering of initial information from the callers. Example information gathered may include a caller name, an account number, and other initial information. Calls may be routed to agents at the call centers to respond to the particular issues for which the particular callers are calling.

SUMMARY

A computer-implemented method includes: by a processor of a computer telephony integration (CTI) client computing device that isolates call processing devices from each of a plurality of back-end business applications of call-center clients for which call-center services are provided within a service provider multi-tenant model by a telephone call center: receiving, during active call processing of an incoming telephone call, a registered call event from a CTI middleware server responsive to an interactive voice response (IVR) system storing real-time call data to an independent stand-alone database in association with a unique call-specific database key; retrieving the unique call-specific database key from the CTI middleware server; retrieving a call database record comprising the real-time call data from the independent stand-alone database using the unique call-specific database key retrieved from the CTI middleware server; and providing, as output on a user interface device, the real-time call data to a trusted call center agent that has separate authorization to access a back-end business application appropriate to continue the active call processing.

A system that performs the computer-implemented method and a computer program product that causes a computer to perform the computer-implemented method are also described.

DETAILED DESCRIPTION

Figure 1:
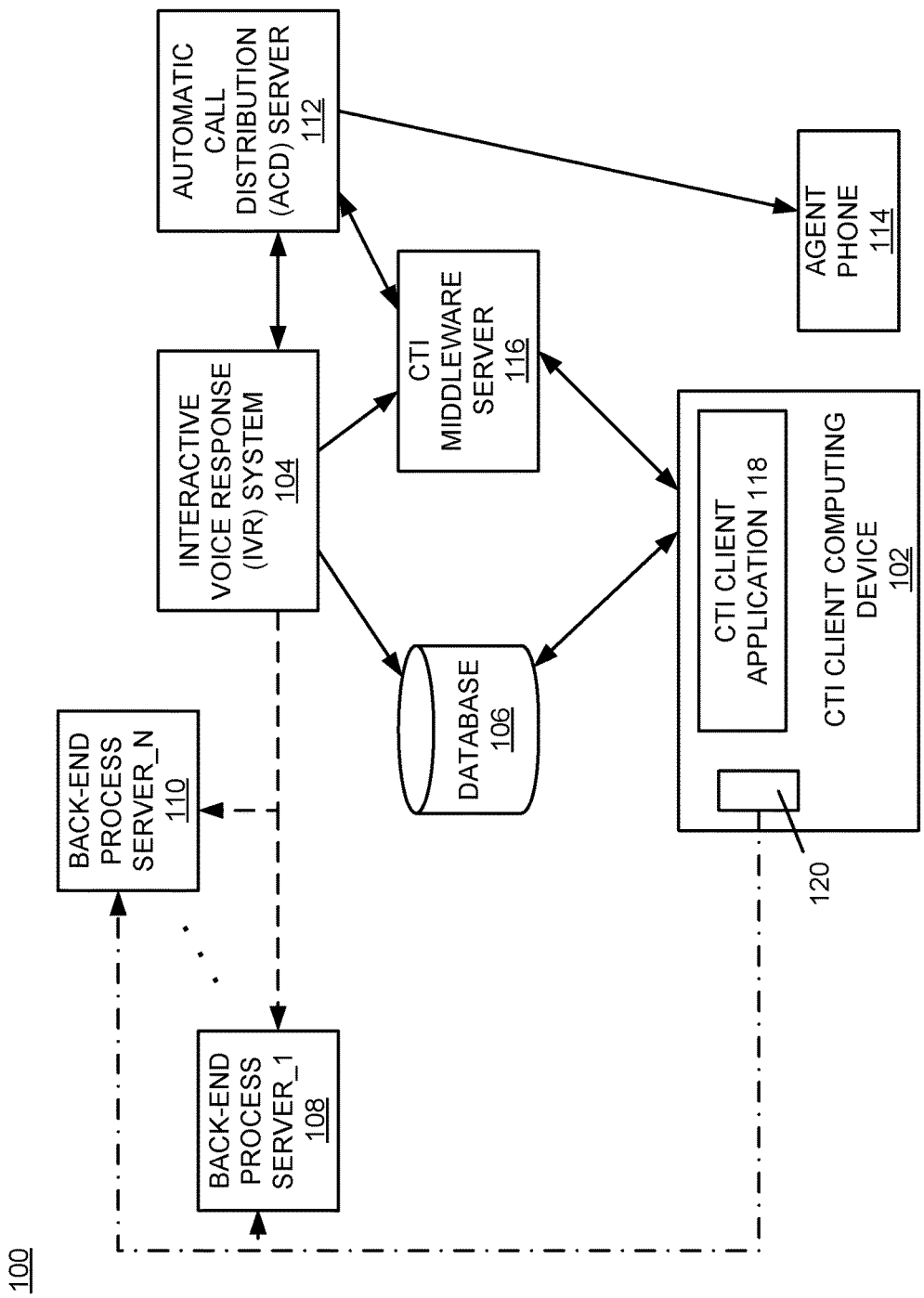
FIG. 1 is a block diagram of an example of an implementation of a system for cross-process computer telephony integration (CTI) client processing according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides a cross-process computer telephony integration (CTI) client. The present technology solves multiple recognized call center information security, real-time call processing, and call center system maintenance problems within complex call center computing environments that provide call center services to multiple different entities. The technology described herein includes a new form of cross-process and cross-platform CTI client computing device and call-center agent interface that isolates multiple back-end processes/applications from programmatic incoming call processing for improved back-end application data security and improved flexibility of call processing. The CTI client provides a single unified cross-platform system that is situated and operates between a front-end interactive voice response (IVR) system at a call center and multiple back-end processes. The CTI client described herein provides a layer of security and programmatic isolation between the front-end IVR system and CTI middleware and the back-end applications that are subject to proprietary and/or confidentiality requirements. The CTI client/device provides a trusted call center agent desktop/system in the form of a cross-platform CTI interface that is designed to be agnostic to both the CTI vendor's middleware and the back-end tools/applications. Within the call-center context, the agnostic/independent design of the CTI client/device utilizes an application programming interface (API) rather than direct programmatic integration, and registers with the call center CTI middleware to receive call events. The CTI client/device interoperates within the call center without programmatic hooks into the multiple different back-end applications to isolate the multiple different back-end applications from call center processing, as described in more detail below.

Call information gathered during an automated initial stage of a call by the IVR system is written by the IVR system to a stand-alone database that is also isolated from the back-end applications. As such, the IVR system described herein operates differently from conventional IVR systems because it does not programmatically route, either directly or indirectly, the gathered call information to an enterprise form of call center application. The single unified cross-platform CTI client system retrieves the call information from the independent stand-alone database, and routes the call information to trusted call agents in real time via a desktop interface. The trusted call center agents are authorized to login to and access the back-end applications/data, and the appropriate back-end application may be populated with or updated using the obtained information by and at the sole discretion of the trusted call center agent, either in an automated manner or by the trusted call agent action.

As such, in contrast to conventional call-center technologies, the CTI client removes previous connection paths that utilized programmatic application programming interfaces (APIs) to the back-end applications, and thereby fully isolates the back-end applications from programmatic access by call center applications that manage the incoming calls. This new approach to isolation of the back-end applications/data prevents remote access to the back-end applications/data and improves security for the back-end application data. Further, because the CTI client operates completely independently of the back-end applications that are utilized by the trusted call center agents, call center maintenance may be improved because the back-end applications may be replaced or updated without requiring programming changes to interface code within the call center. Additionally, because the new CTI client utilizes the independent stand-alone database to retrieve incoming call data without any knowledge of the back-end applications within the call center, new back-end applications may be efficiently added by adding interface processing at the IVR system to capture and store the appropriate data from the caller for the new back-end applications within the independent stand-alone database, without other code changes at other processing nodes within the call center. As such, the technology described herein provides several improvements over conventional call center technologies by improving call center information security, real-time call processing, and call center system maintenance.

The technology described herein operates by implementation of a computer telephony integration (CTI) client computing device that isolates call processing devices from each of a set of back-end business applications of call-center clients for which call-center services are provided within a service provider multi-tenant model by a telephone call center. A registered call event is received from a CTI middleware server during active call processing of an incoming telephone call responsive to an interactive voice response (IVR) system storing real-time call data to an independent stand-alone database in association with a unique call-specific database key. The unique call-specific database key is retrieved from the CTI middleware server. A call database record, including the real-time call data, is retrieved from the independent stand-alone database using the unique call-specific database key retrieved from the CTI middleware server. The real-time call data is provided as output on a user interface device to a trusted call center agent that has separate authorization to access a back-end business application appropriate to continue the active call processing.

The cross-platform client of the CTI system described herein is alternatively termed a "CTI client" for ease of reference. It is additionally understood that, while the description provided herein utilizes the terms "back-end applications" or "back-end processes" interchangeably for ease of reference, the multiple back-end applications/processes architecturally represent distinct systems that host different back-end processes that perform back-end processing of the information harvested by the IVR system and the trusted call center agents. As such, the term "back-end system" may be substituted for the term back-end application herein.

Further, the term "agnostic" as it is utilized herein to describe the relationship of the CTI client to other components is defined to mean that the CTI client is independent of programmatic interaction with these other components. The term agnostic is further defined herein to mean that the CTI client provides a generalized graphical user interface (GUI) that is adapted in real time according to the data requirements of the active call, and that allows the call center agent to determine how and which pieces of data collected by the IVR system will be utilized and/or migrated to the separate back-end application(s) using features of one or more different systems. It should be noted that automated processing may be implemented as appropriate for a given implementation. For purposes of the description herein, it is understood that the CTI client is agnostic relative to each of the IVR system and the different back-end applications, and provides programmatic isolation of the call-center call processing from the back-end applications.

It should additionally be understood that back-end applications may be considered proprietary by the respective business vendors, and as a result call center applications may not be allowed to be integrated directly with the back-end applications. Additionally, business vendors protect customer information, and do not expose all details of a customer's account to front-end (e.g., IVR) call center processing. For example, health care or other types of sensitive information are considered confidential and are strictly regulated against release. As such, the IVR system may not be able to provide complete resolution of the purpose of the caller's inquiry. In such cases, the IVR system may gather the appropriate information to queue up a trusted call center agent to take over and finish processing of the call.

It should further be noted that the back-end applications described herein are different from an enterprise application utilized in certain conventional call centers. Where an enterprise application is developed, owned, and managed by the entity (the "enterprise") that utilizes the enterprise application and runs a call center for call processing, the back-end applications described herein are considered proprietary and are not modifiable to suit call-center coding and interfaces. While an enterprise entity may control programmatic integration of different software modules and devices within an enterprise, and may modify those integrations over time, the technology described herein has no programmatic integration of the back-end applications to the incoming call flow processing.

In contrast to enterprise platform technologies, the technology described herein operates under a service provider multi-tenant model, where the back-end applications may each be developed, owned, and managed by or on behalf of a different customer of the call center. These different customers of the call center to which services are provided under the multi-tenant model may each independently provide a business service (e.g., cable television, phone and internet services, insurance, online-sales, etc.) to the public or another entity, and each may utilize the call center to off-load the telephone call processing portion of their business. The call center described herein provides call-center services to multiple such back-end applications, again in a service provider multi-tenant model. Further, the data managed by these customer-owned back-end applications/systems is customer account information and other proprietary information that is considered confidential and to be protected (e.g., health related information). For purposes of the description herein, the term "back-end application" (or "back-end system") represents a call-center customer-owned proprietary application used to process accounts and related information for the customer in response to call-center services provided separately by the call center. The technology described herein provides the cross-platform CTI client that is capable of isolating and maintaining autonomy of the back-end applications, again for data security, proprietary, and other reasons.

Additionally, the data utilized by/provided to the back-end applications is managed in a unique manner for each back-end application and is not manipulated to form a common interface. In contrast to such conventional technologies, the IVR system as described herein in more detail below identifies the appropriate business process, and gathers the specific data to be utilized by and provided to that particular back-end application. The gathered data is written to a custom data record in the independent stand-alone database, and is thereby stored in a manner and with the specific information needed by the respective back-end application for access by the CTI client. The CTI client accesses the data according to the particular elements of the data that have been stored by the IVR system using the data element identifiers, without prior knowledge of what the data represents.

As introduced above, the CTI client described herein provides a layer of security and programmatic isolation between the front-end IVR system and CTI middleware and the back-end applications that are subject to proprietary and/or confidentiality requirements. The CTI client described herein eliminates any external access to and/or integration with the back-end applications. The trusted call center agent, that is vetted and authorized to login to these back-end applications, may then provide the appropriate credentials to login to the business vendor's protected back-end application and may utilize the information gathered by the IVR via the CTI client/device described herein to interact with the back-end application.

Because the CTI client provides cross-platform access to multiple back-end applications, and provides a single device solution for isolation of a front-end IVR system and CTI middleware relative to the multiple back-end applications, custom software used by previous call-center solutions may be eliminated, thereby reducing costly development and maintenance of software integration at call centers. Further, the CTI client assumes no direct interaction with or modification of the back-end business applications, and relies instead on the trusted call center agents and their CTI workstations to link the data to the respective application.

Regarding setup for call processing, the CTI client establishes a CTI link with the call center CTI middleware. To establish the CTI link, the CTI client registers with the CTI middleware to receive CTI call events from the CTI middleware. This registration process may involve use of appropriate CTI middleware vendor-specific application programming interface (API) calls to request CTI call events for a particular call center agent phone using a specific automatic call distribution (ACD) identifier (ID) associated with and used to route active calls to the particular call agent's phone. Responsive to receipt of a registered event, the CTI client may query the CTI middleware for call details and a unique call identifier of the call. The CTI client may utilize the unique call identifier to query the independent stand-alone database and retrieve a database record that stores real-time call data for the call that was gathered by the IVR system.

The CTI link may be implemented using Java™ programming language classes (or other appropriate interface specification) to interface the CTI client with the CTI middleware. The Java™ programming language (or other) classes provide a real-time data transfer interface to the CTI client. The Java™ programming language (or other) classes may be updated to use/access the appropriate vendor-appropriate CTI middleware APIs to provide a rapid integration between the CTI middleware and the cross-platform CTI client.

The process for initializing/logging in to the CTI client to further configure the CTI client device for call processing may include prompting the call center agent to enter any settings/parameters to be used for call processing, including identification of the independent stand-alone database to be used for call processing (e.g., database name, access path, etc.). The CTI client may then connect to the independent stand-alone database. The CTI client may also connect to the vendor-specific CTI middleware that supports the automated call distribution within the call center. Once connected to the CTI middleware, the CTI client may utilize the appropriate vendor-specific API calls to request CTI events (e.g., register) for the agent's specific phone/ACD ID. Upon completion of the connections, the CTI client may begin processing to receive call events and process calls.

Regarding incoming call processing, the IVR system may determine the appropriate business process to be invoked according to the initial information gathered during the initial call information gathering. For example, because each different business process may have a different format for account numbers, the IVR system may determine the appropriate back-end business application to be invoked for a call according to the account number and/or account number format spoken or entered by the caller, and from other information obtained during the automated call processing. The IVR system gathers data as per the business process requirements from the caller in an automated manner, and stores the gathered data in the independent stand-alone database that is independent of any business application. The IVR attaches the stand-alone database key to the call via the private branch exchange (PBX) vendor's CTI middleware (which is also independent of any business application). The CTI middleware creates a call event to the CTI client and passes the stand-alone database key to the CTI client. The CTI client receives the stand-alone database key from the vendor's CTI middleware, queries the independent stand-alone database to extract the IVR-gathered call data, and presents the data to the agent visually. The graphically presented information facilitates transfer of real-time IVR-gathered information during an active call to the appropriate back-end application. A separate ACD system may route the active call to the call center agent's phone.

It should be noted that the PBX and the ACD interoperate during call processing. From an event flow perspective, the programmatic ordering of events may include the PBX/ACD routing a call to the trusted call center agent phone, followed by the CTI middleware sending an event to the CTI client device to notify the CTI client device of the phone receiving the call. As such, the call may arrive at the agent's phone before the call notification event, as the event is a notification of the call arriving.

To further detail this phase of processing, the IVR attaches the stand-alone database key to the call via the PBX vendor's call center CTI middleware. It should be noted that the CTI middleware is also independent of any of the different back-end applications. The PBX vendor's ACD system routes the active call to the call center agent's phone. In parallel, the CTI middleware creates a call event to the CTI client notifying it of the arrived call, and passes the stand-alone database key to the CTI client. The CTI client receives the stand-alone database key from the vendor's CTI middleware, queries the independent stand-alone database to extract the IVR-gathered call data, and presents the data to the agent visually. The graphically presented information facilitates transfer of real-time IVR-gathered information during an active call to the appropriate back-end application, without programmatic integration (i.e., no API) to the back-end applications.

The CTI client is purposefully not programmed to have knowledge of the import of the particular data elements stored by the IVR system, and as such retrieves the stand-alone database record and presents the individual data elements to the trusted call center agent without use of customized code for each business application. The stand-alone database record itself serves as the scope of knowledge of the CTI client.

Accordingly, the CTI client addresses the many challenges of integrating the CTI system to multiple back-end applications/systems by providing a set of technical features. First, the stand-alone database that is independent of the back-end tools and applications is accessed by the IVR system and by the CTI client. The CTI client also provides a flexible graphical user interface (GUI) that allows different types of data to be presented to the call center agent, based upon the appropriate/particular back-end process.

If the back-end application is web-based and supports query strings and the IVR system stores a uniform resource locator (URL), the CTI client may display a clickable URL within the GUI, and may optionally programmatically launch the URL in the CTI client's default browser automatically. The GUI may further allow the trusted call center agent to efficiently pull the data out of the GUI for use in whichever back-end tool(s) and application(s) are appropriate/required by that call's back-end process. The CTI client further provides cross-platform language support for various operating systems and workstation builds to allow rapid integration with multiple back-end systems.

By using a stand-alone database that is independent of the back-end tools and applications, any amount of data may be passed from the IVR to the trusted call center agent, limited only by the ability to place the data into a stand-alone database entry and available storage. The storage may be expanded as appropriate for the given implementation. The data further is not restricted by the back-end application's capabilities. While there may be a physical screen area limit to how much the CTI client may display graphically at any given moment, the CTI client may be configured to display additional data as per business requirements, such as by use of an additional user interface selection to scroll or page to the additional data.

Once the IVR system has completed its interaction with the caller, the IVR system stores the data in the stand-alone database, which will then be retrieved by the CTI client on the agent's workstation. The agent may then use some, all, or none of the data, depending on the particular back-end process that is supporting the active call.

For each data element displayed on the CTI client, a button may be provided to allow that data element to be copied to the workstation clipboard with one click. This allows the call center agent to quickly copy data out of the CTI client and into whatever back-end tool or application that is being used to support the back-end process associated with the call.

As introduced above, if the back-end application is web-based and supports query strings, and the IVR system placed a URL within one of the stand-alone database entries associated with the call, a clickable URL may be displayed in the CTI client. An option within the CTI client may be configured to have the URL programmatically traversed and opened in the workstation's default browser when a call is answered by the call center agent.

An example of the type of URL that may be configured by the IVR system in response to identification of the appropriate back-end application and provided via the independent stand-alone database to the CTI client is shown below.

<<http://your.server.name.com>>/BusinessApplication/?ticketNum=[unique_value]

Within the example URL shown above, the double caret symbols (e.g., "<<" and ">>") are used to avoid entry of an actual URL within the present document, and are not considered part of a URL that would be utilized as described herein. The portion of the example URL "your.server.name.com" represents a unique path to a server that hosts the back-end application to be invoked for the call. The "BusinessApplication" is the actual back-end application to be invoked. The remaining information may be created as appropriate for the given back-end application processing requirements. Within this example, a "ticketNum" field is shown populated with a "unique_value" that may be utilized when invoking the back-end application to retrieve the caller's account within the back-end application. Multiple items of detailed information may be configured within a URL, and this information is considered a query string that may be used for one or more query operations within the designated back-end application. It should be noted that the query string is distinct from a conventional session cookie, and should not be confused with a session management token or value.

The CTI client may be developed in the Java™ programming language to support re-use across various operating systems, or otherwise developed as appropriate for a given implementation. Use of the Java™ programming language or similar technology may allow each back-end process or customer to have its own unique workstation build without affecting the operation of the CTI client. Due to this re-use, the same CTI client may be used by a single call center agent to support multiple different back-end customers in an outsourcer model.

It should be noted that conception of the present subject matter resulted from recognition of certain limitations associated with call center processing. For example, it was observed that technology that is utilized at call centers can range from older "green screen" computing platforms to modern web-based platforms. It was further observed that, with the proliferation of service-based business models within which one call center/entity may process calls for multiple different businesses, the back-end business processes may differ for each of the different businesses. Further, these different back-end processes may operate completely independently and may use completely different tools as part of their processes. It was observed that this multi-system environment conventionally results in dozens of different tool implementations. An often-complex configuration process to enable a tool to interact with a contact center middleware must be replicated dozens of times across the call center. It was further observed that conventional technologies attempted to provide customized "middleware" solutions for each particular back-end business process. However, it was determined that the customized middleware solution was outdated and inflexible to new process development, and resulted in no integration between the call center agent and the automated customer interaction tools (e.g., IVR). It was additionally observed that conventional tools that extract data from the middleware and present the data to the call center agent is often times a complex application that is embedded deeply into the back-end business application. It was further determined that this complex embedded integration into the back-end business application was not reusable because it was application specific, and further created a security concern because of the programmatic integration between the call center front-end and the back-end business application/data. It was determined from these several observations that a new technological cross-platform interface that is programmatically independent of, yet interfaces with, multiple back-end business processes would provide improved security. It was further determined that a new technological cross-platform interface that was flexible and reusable as back-end processes/applications evolved and changed over time would technologically improve computational processing at call centers that process calls for multiple different businesses. In addition to the technological platform improvements, because this new cross-platform interface provides a single interface to the multiple back-end processes, this new cross-platform interface may contemporaneously decrease call center costs over time because of reuse of the new platform technology and improved maintainability of the new platform. Additionally, because the embedded tooling is removed from the back-end business applications, the back-end business applications may perform their processing more rapidly, development and maintenance of the business applications may be improved, and security of the data protected by these applications may be improved. It was additionally determined that because of the single cross-platform client process integration with multiple back-end processes, call center processing and call routing times to call center agents may be reduced because of more efficient call routing, and because different middleware solutions would not have to be selected and separately managed in real time. The present subject matter improves call center processing by providing a cross-process computer telephony integration (CTI) client, as described above and in more detail below. As such, improved call throughput may be obtained through use of the present technology.

The cross-process computer telephony integration (CTI) client processing described herein may be performed in real time to allow prompt selection and routing of active call information to different back-end processes. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for cross-process computer telephony integration (CTI) client processing. The system 100 may be implemented within a call center that provides call center services to multiple different entities that each have separate business relationships and service offerings with their respective customers. FIG. 1 depicts an example architectural implementation of a system of components that may be used to implement an end-to-end call center process supported by a CTI client computing device 102. It should be understood that multiple CTI client computing devices 102 may be implemented, and that the architectural implementation shown in FIG. 1 depicts only the one CTI client computing device 102 to avoid crowding in the drawing. It should additionally be understood that the various components depicted in FIG. 1 may communicate via one or more networks. The lines that interconnect certain ones of the various components within FIG. 1 represent network or other forms of interconnections, as well as information flow and directional control processing in certain circumstances, as described in more detail below. Interconnectivity of components may include any form of interconnections suitable for the intended purpose, including a private or public network such as an intranet or the Internet, respectively, direct inter-module interconnection, dial-up, wireless, or any other interconnection mechanism capable of interconnecting the respective devices.

As will be described in more detail below in association with FIG. 2 through FIG. 5, the CTI client computing device 102 may provide automated cross-process computer telephony integration (CTI) client processing. The automated cross-process CTI client processing is based upon isolation of and selective trusted agent access to multiple back-end processes for improved security, computational call processing, and maintenance within complex call center computing environments that provide call center services to multiple different entities. The present technology may be implemented at a user computing device or server device level, or by a combination of such devices as appropriate for a given implementation. A variety of possibilities exist for implementation of the present subject matter, and all such possibilities are considered within the scope of the present subject matter.

Regarding call flow processing within the system 100, an interactive voice response (IVR) system 104 may be any system that interacts with a caller, either through the phone or through some other electronic mechanism, in which information about the caller may be gathered during an active call. This interaction may be explicit (e.g., asking the caller questions) or implicit (e.g., using an automatic number identification (ANI) or email address of the caller) to capture information during the call.

An independent stand-alone database 106 supports the CTI client computing device 102, as described above and in more detail below, to provide cross-platform CTI processing for the multiple different business applications hosted by the back-end process server_1 108 through the back-end process server_N 110. The database 106 is independent of any hosted business application, and allows the IVR system 104 to store data that may be retrieved later by the CTI client computing device 102.

The database 106 may further be utilized to store and provide configuration information for the IVR system 104, using the form and formats (e.g., account number format, etc.) that allow the IVR system 104 to determine which business application is associated with a particular call/caller. The IVR system 104 may query the database 106 to retrieve one or more records for each business application, such as at start up or otherwise, to retrieve account format information and other information by which to determine for which business application it is gathering information along with any custom data fields needed/utilized by the respective different business applications.

The database 106 may be a database containing one or more tables utilized to support the CTI client computing device 102. The database 106 may include a relational database, an object database, or any other storage type of device. As such, the database 106 may be implemented as appropriate for a given implementation.

A back-end process server_1 108 through a back-end process server_N 110 host business applications. The hosted business applications may be any system or set of systems that may be used as part of the business-level processing to query information, perform activities, or perform other technical processing related to one or more calls. For example, directly-accessed external databases, web services, or even flat data files may be considered technical actions performed by hosted business applications for purposes of the present description.

As an alternative to storing the configuration information for the IVR system 104 within the database 106, a dashed-line interconnection is shown between the IVR system 104 and the back-end process server_1 108 through the back-end process server_N 110 to represent an "optional" "limited" interface between the respective devices. As described in detail above, the CTI client computing device 102 may provide programmatic isolation between the call center technological components, such as the IVR system 104, and business applications hosted by the back-end process server_1 108 through the back-end process server_N 110. However, the IVR system 104 is responsible for learning from a particular caller which of the respective business applications is associated with the call by the nature of the information initially provided by the caller, and then utilizing the initial information to gather additional business process call-specific data from the caller to assist the trusted call center agent.

As described above, the IVR system 104 may utilize a format of a particular account number spoken or entered by the caller or other information as appropriate for a given implementation to determine which business application is associated with the call. As such, the IVR system 104 must be configured with or provided with access to information that allows the IVR system 104 to perform its designated function of gathering the additional business process call-specific data from the caller. The IVR system 104 may have a "limited" data-access path represented by the dashed-line interconnection shown in FIG. 1 by which to query the respective servers or business applications hosted by the back-end process server_1 108 through the back-end process server_N 110 if appropriate for a given implementation, with the understanding that customer data records would not be accessible over this limited data-access path. In contrast, this limited data-access path may be implemented as a non-application programming interface (non-API) to allow the IVR system 104 to query isolated data records that include business process call-specific information identifiers usable by the IVR system 104 to gather the appropriate information from the caller prior to passing the call on for agent-level processing. As described in more detail below, the IVR system 104 may be configured in other manners to allow complete isolation between the call center platform technologies and the data of the back-end applications, such that no application programming interface (API) or other programmatic access to the business applications is provided.

An automatic call distribution (ACD) server 112 performs call-center processing to route calls to call-center agents in response to completion of initial information gathering by the IVR system 104. The ACD server 112 may be any system that contains the appropriate logic to route a call or electronic interaction from a caller to a call-center agent, by way of an agent phone 114, for further processing. It is understood that multiple call-center agents may be located in a call center, and though only one agent phone 114 is depicted in the drawing to avoid crowding, the depiction of the agent phone 114 is intended to represent multiple such agent phones.

A CTI middleware server 116 provides middleware call processing services within the system 100. The CTI middleware server 116 interacts with the ACD server 112, tracks interactions that flow through the ACD server 112, retains additional metadata about the interactions, passes events about the interactions on to CTI client computing device 102, and receives command requests from the CTI client computing device 102.

Further regarding the CTI client computing device 102, the CTI client computing device 102 hosts a call-center agent workstation (not shown) and represents a system used by the call-center agent to provide individualized call services related to the particular business process/application for which the call is related. The agent may utilize the CTI client computing device 102 to complete any further processing on interactions or calls. A CTI client application 118 is installed on the agent workstation hosted by the CTI client computing device 102. The CTI client application 118 in combination with the CTI client computing device 102 perform the detailed processing described herein to perform cross-process computer telephony integration (CTI) client processing.

It should be noted that the CTI middleware server 116 may be considered a "client" of the ACD server 112 (e.g., of the PBX/ACD). The CTI middleware server 116 monitors calls as they move through the ACD server 112. The IVR system 104 and the CTI client application 118 may be considered "clients" of the CTI middleware server 116 as they interact with specific calls.

As described above and in more detail below, the CTI client computing device 102 and the CTI client application 118 provide programmatic isolation between the call center platform devices (e.g., the IVR system 104 and the CTI middleware server 116, etc.) to improve security of back-end application customer data. The programmatic isolation is provided by way of a copy/paste feature of the CTI client application 118 that limits the interconnection between the CTI client computing device 102 and the back-end applications to use of an operating system copy buffer (e.g., clipboard) 120 of an operating system of the CTI client computing device 102. Because no programmatic connection is provided between the CTI client application 118 and the back-end applications hosted by the back-end process server_1 108 through the back-end process server_N 110, there is no API through which unauthorized access may be achieved from outside of the call center. The trusted agent utilizes the respective back-end application on the agent's desktop, and again the only interconnection is the copy buffer of the operating system of the CTI client computing device 102 via an interconnection (e.g., a network connection) to the back-end process server_1 108 through the back-end process server_N 110. The dotted-dashed line interconnections shown within FIG. 1 between the operating system copy buffer 120 and the back-end process server_1 108 through the back-end process server_N 110 symbolically represent copy/paste functionality between the CTI client computing device 102 and one or more back-end business applications executed on a desktop of the CTI client computing device 102, such as within a web browser application (not separately illustrated) where the back-end business application has a web-based user interface. As such, there is no programmatic (API-based) interface to the back-end business applications.

As described above, in contrast to conventional technologies that utilize API-based access between the enterprise applications and the call-center platform technologies that are fully owned and maintained by the call centers (as a set of enterprise installations), the technology described herein provides improved security of back-end business application customer data in a service provider multi-tenant model. The back-end applications are owned and maintained by the entities that consume the services provided by the call center. By omitting API code by which to access the back-end service provider business applications from the call center devices, and the present technology provides improved maintainability of the back-end service provider business applications themselves separate from the call center devices (e.g., the IVR system 104).

Further regarding the agent phone 114, the agent phone 114 may be a physical or virtual device used by the call-center agent to log into the ACD server 112 to further handle interactions. For example, when implemented as a physical device, the agent phone 114 may be an Internet Protocol (IP) phone, a digital phone, or other physical device, as appropriate for a given implementation. When implemented as a virtual device, the agent phone 114 may be a virtual device provided through programmatic processing on the call-center agent's workstation, or otherwise again as appropriate for a given implementation.

Figure 2:
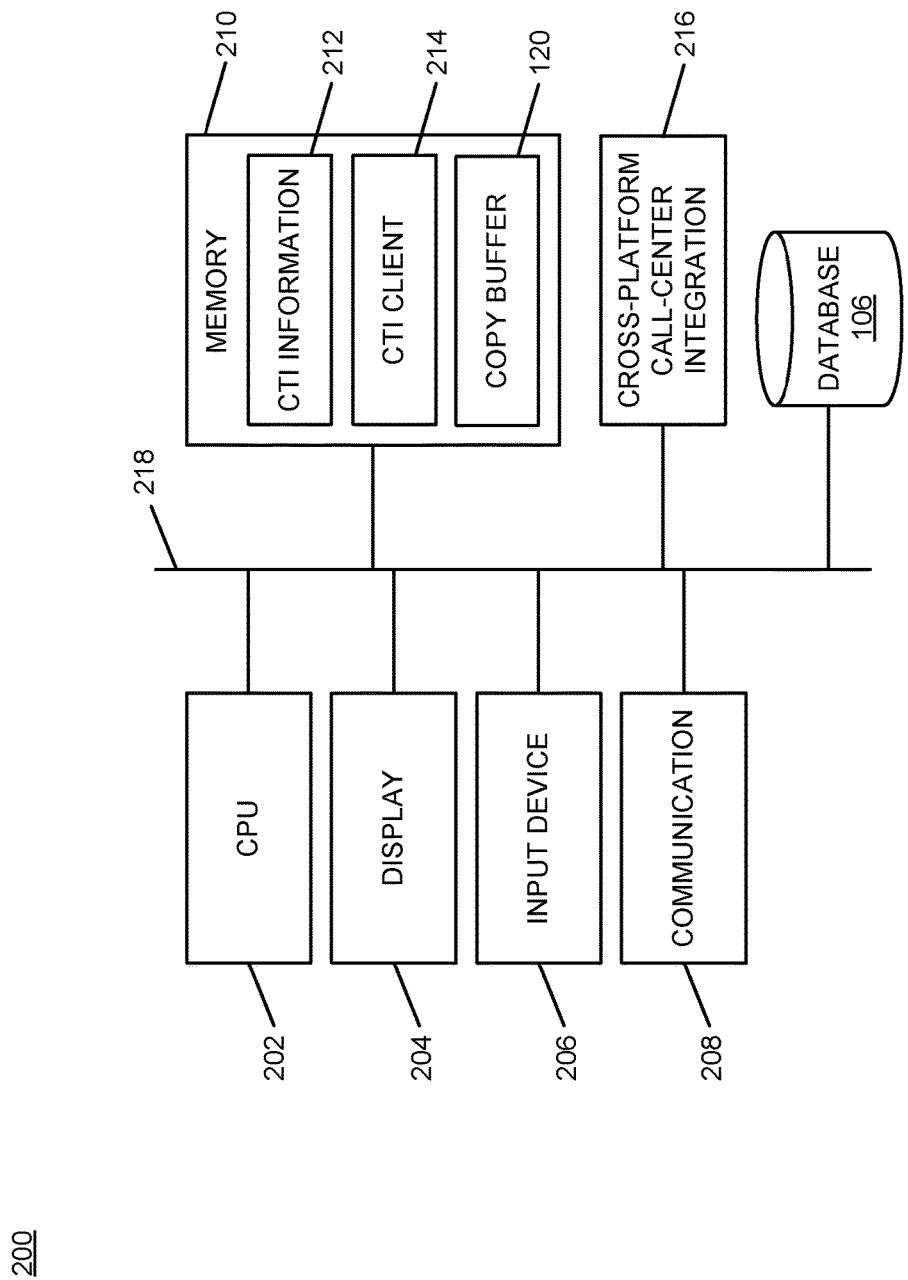
FIG. 2 is a block diagram of an example of an implementation of a core processing module capable of implementing a cross-process computer telephony integration (CTI) client according to an embodiment of the present subject matter.

FIG. 2 is a block diagram of an example of an implementation of a core processing module 200 capable of implementing a cross-process computer telephony integration (CTI) client. The core processing module 200 may be associated with either the CTI client computing device 102, or the components of the core processing module 200 may be implemented in association of each other device depicted within FIG. 1, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

The core processing module 200 may provide different and complementary processing of cross-platform information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a CTI information storage area 212 that stores call-specific information for routing and processing calls within the core processing module 200. The memory 210 also includes a CTI client storage area 214 that provides storage and execution memory for the CTI client application 118. The operating system copy buffer 120 is illustrated within the memory 210 and provides a clipboard memory area usable by an operating system of the core processing module 200 to provide the data isolation between the call center platform and the back-end service provider applications, as described above.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A cross-platform call-center integration module 216 is also illustrated. The cross-platform call-center integration module 216 provides processing capabilities for integrating call information in real time with a selected call-specific back-end server/process, such as one of the business applications hosted on one of the back-end process server_1 108 through the back-end process server_N 110, for the core processing module 200, as described above and in more detail below. The cross-platform call-center integration module 216 implements the automated cross-process computer telephony integration (CTI) client processing of the core processing module 200.

It should also be noted that the cross-platform call-center integration module 216 may form a portion of other circuitry described without departure from the scope of the present subject matter. The cross-platform call-center integration module 216 may form a portion of an interrupt service routine (ISR), a portion of an operating system, or a portion of an application without departure from the scope of the present subject matter. The cross-platform call-center integration module 216 may also include an embedded device with circuitry designed specifically to perform the processing described herein as appropriate for a given implementation.

The independent stand-alone database 106 is again shown within FIG. 2 associated with the core processing module 200. As such, the database 106 may be operatively coupled to the core processing module 200 without use of network connectivity, as appropriate for a given implementation.

The CPU 202, the display 204, the input device 206, the communication module 208, the memory 210, the cross-platform call-center integration module 216, and the database 106 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the independent stand-alone database 106 is illustrated as a separate component for purposes of example, where the core processing module 200 is implemented within the CTI client computing device 102, the information stored within the database 106 may also/alternatively be stored within the memory 210 without departure from the scope of the present subject matter. Accordingly, the core processing module 200 may take many forms and may be associated with many platforms.

Figure 3A:
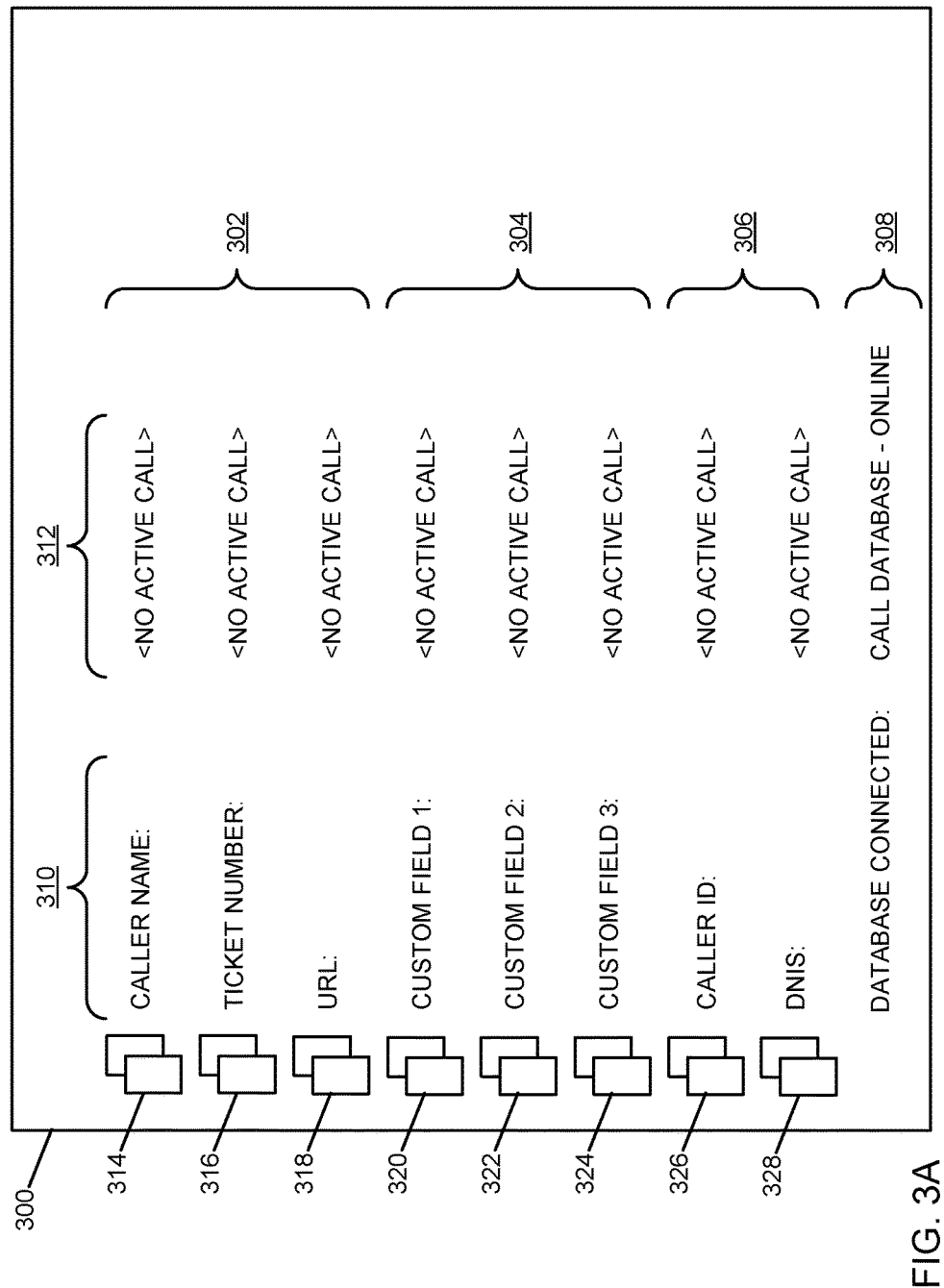
FIG. 3A is an illustration of a sequence of outputs of an example of an implementation of a graphical user interface (GUI) panel of a cross-process computer telephony integration (CTI) client that shows a default/initial state of the GUI panel according to an embodiment of the present subject matter.
Figure 3B:
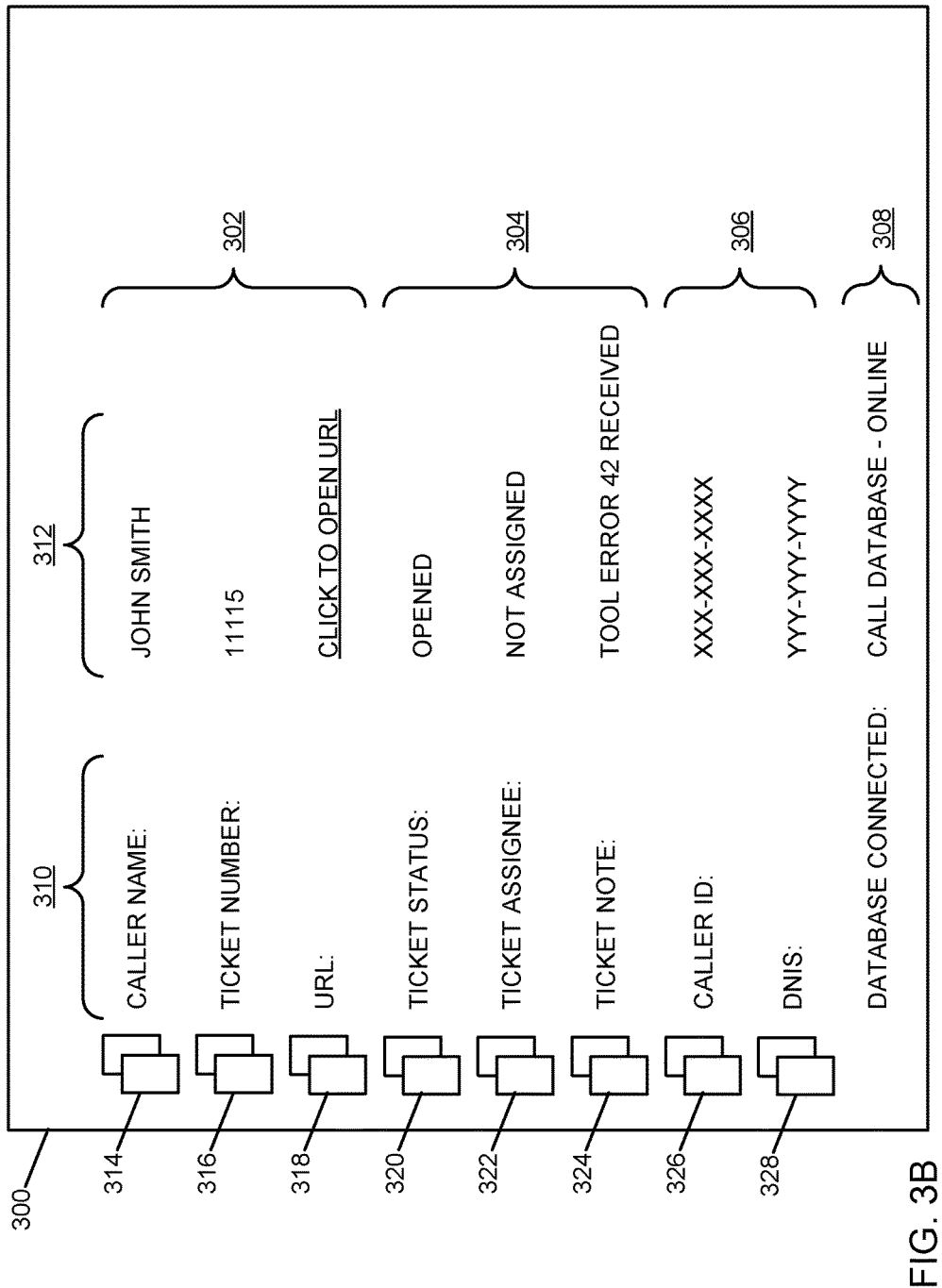
FIG. 3B is an illustration of an example of an implementation of an active call state of the GUI panel of FIG. 3A according to an embodiment of the present subject matter.

FIGS. 3A-3B illustrate a sequence of outputs of a graphical user interface (GUI) panel 300 of an example of an implementation of a cross-process computer telephony integration (CTI) client. FIG. 3A shows a default/initial state of the GUI panel 300. In this state, the agent's phone has no active call, and there is no call data displayed within the GUI panel 300. It should be understood that the quantity, arrangement, and specific details of the data fields shown within FIGS. 3A-3B is not to be considered limiting, and other quantities, arrangements, and specific details may be utilized as appropriate for a given implementation.

The GUI panel 300 is logically partitioned into four (4) sections. A first output fields section 302 provides output fields for business data that is utilized by a majority of different business processes for which calls may be managed within a call center. A second output fields section 304 provides output fields for custom business data that is specific to a particular back-end application, the data element label/identifier may be adjusted based on the data attached to the call, and the value of that data may be displayed. A third output fields section 306 provides output fields for call-specific data, such as Automatic Number Identification (ANI)/caller ID and Dialed Number Identification Service (DNIS) information. A fourth output fields section 308 provides output fields for database-specific data that specifies the independent stand-alone database in use for call processing.

A column 310 of data element labels/identifiers includes names of data fields within the GUI panel 300, while a column 312 of data element values includes data values associated with the data element identifiers of the column 310. As can be seen from FIG. 3A, data element identifiers in the column 310 that are within the first output fields section 302 include "caller name," "ticket number," and "URL" text entries. Data element identifiers that are in the column 310 that are within the second output fields section 304 include "custom field 1," "custom field 2," and "custom field 3" text entries. Data element identifiers in the column 310 that are within the third output fields section 306 include "caller ID," and "DNIS" text entries. A data element identifier in the column 310 that is within the fourth output fields section 308 includes a "database connected" text entry.

As can be seen from FIG. 3A, a call is not currently active and data values of each of the output fields section 302-306 within the column 312 output "<no active call>" text values. The fourth output fields section 308 states the connected database name and status of "call database—online." As such, the GUI panel 300 shows that a connection to the independent stand-alone database has been established and shows a ready state for call processing.

As described above, the output fields may be populated with data according to database record element identifiers. As such, for the first output fields section 302 and the third output fields section 306, database record element identifiers may be matched within the database record to populate the appropriate data field values. For the second output fields section 304, the output field names may be populated according to any custom database record element identifiers found within the database record for the call.

Copy/paste icons 314-328 are provided within the GUI panel 300 to allow a trusted call center agent to individually copy the associated data value displayed in the column 312 to a clipboard of the CTI client device. The trusted call center agent may paste the individual data element from the clipboard into an appropriate data field of the respective back-end application that is associated with the call. In this way, the only data interface to the back-end applications is the clipboard of the CTI client device. As a result, programmatic data access from the call center processes to the back-end applications is prohibited, and data security at the back-end applications is enhanced.

FIG. 3B shows an active call state of the GUI panel 300. As can be seen from FIG. 3B, the custom data fields of the second output fields section 304 within the column 310 have been populated with custom data "ticket status," "ticket assignee," and "ticket note." These data field identifiers represent database element identifiers within the database record that specify information that is specific to the back-end application that is associated with this particular call.

As can also be seen from FIG. 3B, the column 312 has been populated with data in each of the output fields sections 302-306. This data represents business process specific data that has been provided by the caller during the call. Within the first output fields section 302, the caller name value of "John Smith" is displayed, a ticket number of "11115" is displayed, and a URL of "click to open URL" is displayed.

As such, for purposes of the present example, it is presumed that the back-end business application is web-based and supports query strings, so a clickable URL has been displayed. The text "click to open URL" is underlined to show that this is a clickable URL and not just a text string.

Further, the text "click to open URL" represents an instruction to the trusted call center agent to "click" the link to navigate the URL and open the appropriate back-end application identified by the IVR system, and as described above. Alternatively, the text of the URL may be output as the actual URL that is navigated, such as the example type of URL that may be configured by the IVR system, as described above. It should be noted for purposes of the present description that opening the appropriate back-end application by use of a URL opens an application-level user interface (UI) and, as such, does not create a programmatic link between the CTI client computing device 102 and the respective back-end process server because there is no application programming interface (API) that is being used in a programmatic manner by the CTI client computing device 102. Instead, opening the appropriate back-end application by use of a URL provides the application-level user interface to the respective back-end application, and that application-level user interface is usable by the trusted call center agent to selectively copy and paste individual pieces of data into the respective back-end application.

As also described above, the GUI panel 300 may be configured with a setting that allows the GUI panel 300 to automatically navigate the URL to launch a separate web browser application to access the target/appropriate back-end application to be used to complete processing for the call. Within the present example, the trusted call center agent is provided with the control to select the URL at an appropriate time if and/or as needed to complete processing for the call. As such, where access to the back-end application is not needed to complete the caller's inquiry, the back-end application need not even be opened, which may further enhance data security.

Continuing with the description of FIG. 3B and the column 312, within the second output fields section 304, the custom field "ticket status" has been populated with custom data "opened." The custom field "ticket assignee" has been populated with custom data "not assigned." The custom field "ticket note" has been populated with custom data "tool error 42 received," which specifies for purposes of example an error code generated by an application used by the caller. As such, and as described above, the custom data fields/labels in column 310 within the second output fields section 304 have changed to reflect the type of business data provided, and the data field values within the column 312 have been updated to display the value of the data elements.

Within the third output fields section 306 of the column 312, the "caller ID" field has been populated with a text data variable "XXX-XXX-XXXX" for purposes of example to represent a valid phone number from which the caller called the call center without reciting an actual telephone number herein. Similarly, the "DNIS" field has been populated with a text data variable "YYY-YYY-YYYY" that is representative of the telephone number the caller called to reach the call center for purposes of example, and again without reciting an actual telephone number herein.

As introduced above, the trusted call center agent may granularly select any of the copy/paste icons 314-328 to individually copy the associated data value displayed in the column 312 to a clipboard of the CTI client device. From the clipboard the trusted call center agent may paste the individual data element from the clipboard into an appropriate data field of the respective back-end application that is associated with the call. In this way, the only data interface to the back-end applications is the clipboard of the CTI client device. As a result, programmatic data access from the call center processes to the back-end applications are prohibited, and data security at the back-end applications is enhanced.

Figure 4:
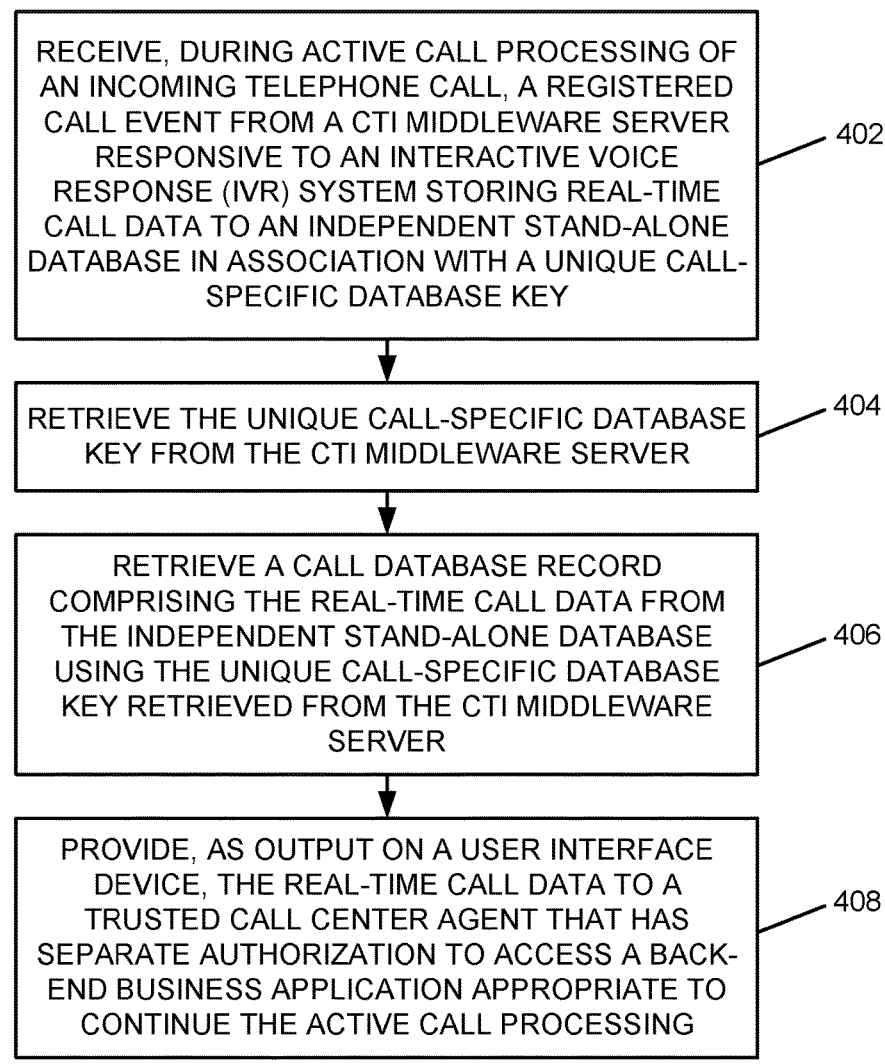
FIG. 4 is a flow chart of an example of an implementation of a process for cross-process computer telephony integration (CTI) client processing according to an embodiment of the present subject matter.
Figure 5:
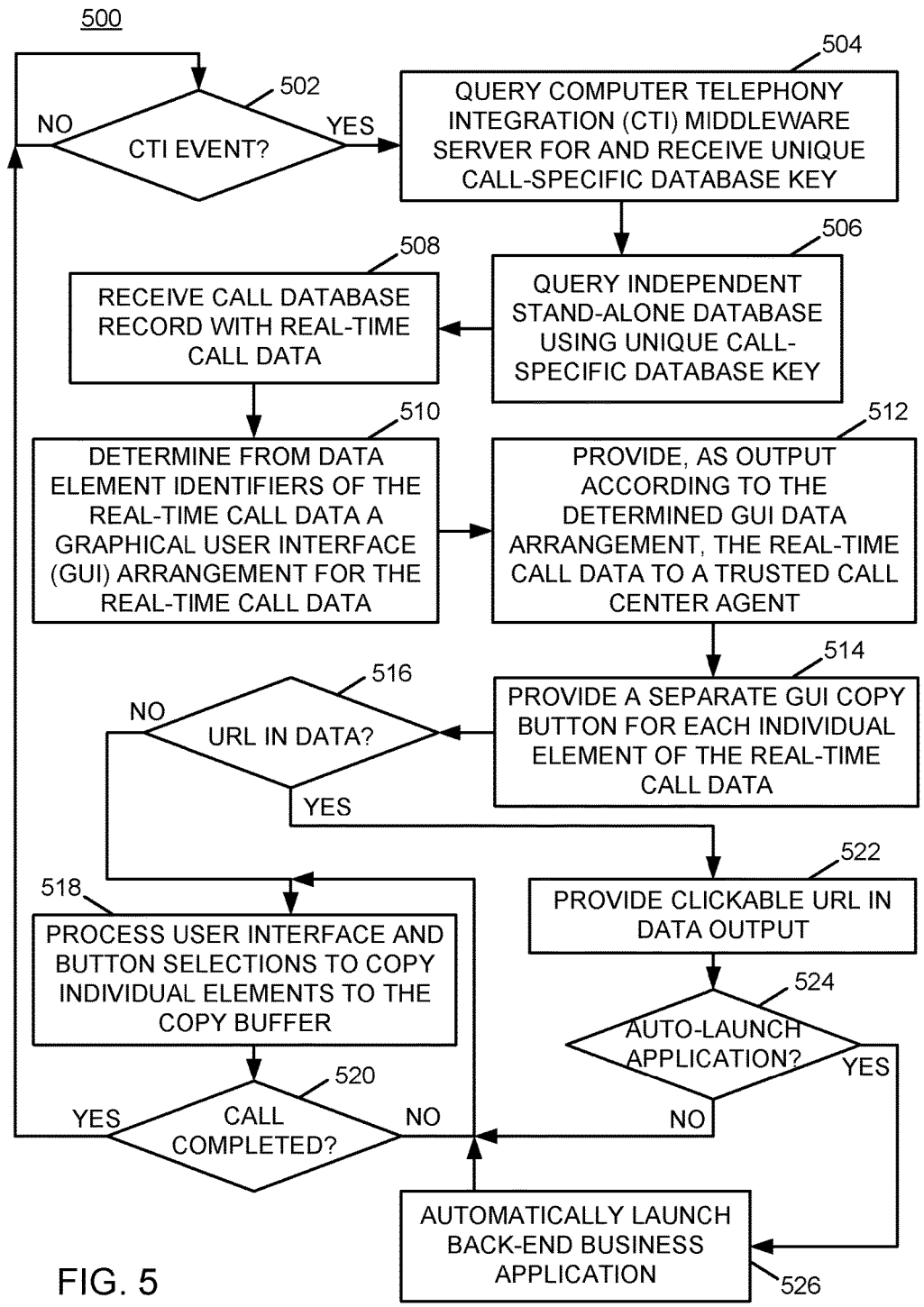
FIG. 5 is a flow chart of an example of an implementation of a process for cross-process computer telephony integration (CTI) client processing that further details processing of the CTI client application interface according to an embodiment of the present subject matter.

FIG. 4 through FIG. 5 described below represent example processes that may be executed by devices, such as the core processing module 200, to perform the automated cross-process computer telephony integration (CTI) client processing associated with the present subject matter. Many other variations on the example processes are possible and all are considered within the scope of the present subject matter. The example processes may be performed by modules, such as the cross-platform call-center integration module 216 of the CTI client computing device 102 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for cross-process computer telephony integration (CTI) client processing. The process 400 represents a computer-implemented method of performing the subject matter described herein by a processor of a computer telephony integration (CTI) client computing device that isolates call processing devices from each of a plurality of back-end business applications of call-center clients for which call-center services are provided within a service provider multi-tenant model by a telephone call center. At block 402, the process 400 receives, during active call processing of an incoming telephone call, a registered call event from a CTI middleware server responsive to an interactive voice response (IVR) system storing real-time call data to an independent stand-alone database in association with a unique call-specific database key. At block 404, the process 400 retrieves the unique call-specific database key from the CTI middleware server. At block 406, the process 400 retrieves a call database record comprising the real-time call data from the independent stand-alone database using the unique call-specific database key retrieved from the CTI middleware server. At block 408, the process 400 provides, as output on a user interface device, the real-time call data to a trusted call center agent that has separate authorization to access a back-end business application appropriate to continue the active call processing.

FIG. 5 is a flow chart of an example of an implementation of a process 500 for cross-process computer telephony integration (CTI) client processing that further details processing of the CTI client application interface. The process 500 represents a computer-implemented method of performing the technical subject matter described herein.

Initial call processing by the IVR system 104 is not illustrated within FIG. 5 for brevity and to focus on the processing at the CTI client computing device 102, such as by the cross-platform call-center integration module 216. The initial call processing by the IVR system 104 is understood to include the IVR system 104 receiving a call to process and beginning interaction with the caller to gather initial call data. As part of the business process associated with the call, the IVR system 104 determines which of the one or more business applications hosted by the back-end process server_1 108 through the back-end process server_N 110 are associated with the call. This determination may be performed using business process configuration information (e.g., account number format, etc.) as described above. As part of the incoming call processing, the IVR system 104 determines the call is to be transferred to a trusted call center agent that has authorization to login to the back-end application(s) and protected caller account information. The IVR system 104 identifies and captures data that is to be passed to the agent's workstation in real time as part of the end-to-end call processing. The IVR system 104 stores the data and a unique call identifier in the standalone database 106 that is independent from the business process. The IVR system 104 also uses vendor-specific APIs to attach/associate the unique call identifier to the call in the vendor-provided CTI middleware hosted by the CTI middleware server 116. The IVR system 104 then transfers control of the call to the contact center ACD server 112, which puts the call into a queue waiting for the next available agent. When an agent matching the queuing criteria becomes available, the ACD server 112 transfers the call to the appropriate agent phone 114.

Turning now to the description of FIG. 5 and the processing at the CTI client computing device 102, such as by the cross-platform call-center integration module 216, at decision point 502, the process 500 makes a determination as to whether a registered call event (a "CTI event") has been received from the CTI middleware server 116 that indicates that a call has arrived. A registered call event may be received during the active call processing of the incoming telephone call from the CTI middleware server in response to the CTI device registering with the CTI middleware server to receive the registered call event using an application programming interface (API) provided by the CTI middleware server. This registration is considered a portion of the process 500 at block 502, and may be performed as appropriate for a given implementation. In response to determining that a CTI event has been received from the CTI middleware server 116 that indicates that a call has arrived, at block 504 the process 500 queries the CTI middleware server 116 for and receives (collectively retrieves) a unique call-specific database key by which to retrieve the initial call data gathered by the IVR system 104.

At block 506, the process 500 queries the independent stand-alone database 106 using the unique call-specific database key. At block 508, the process receives (retrieves) a call database record from the independent stand-alone database 106 with real-time call data. The call database record includes the initial real-time call data gathered by the IVR system 104 for the call.

At block 510, the process 500 determines from data element identifiers of the real-time call data a graphical user interface (GUI) arrangement for the real-time call data, including any custom data identifiers that are specific to the particular back-end business application associated with the call. At block 512, the process 500 provides, as output according to the determined GUI data arrangement, the real-time call data to a trusted call center agent.

As such, the process 500 provides the output within a graphical user interface (GUI) that is uniquely adapted to each of the different back-end applications according to different data requirements of each of the different back-end applications. For example, for any given call, the process 500 may determine, based upon data element identifiers of the real-time call data in the retrieved database record, (i) common data fields among the plurality of back-end business applications and (ii) custom data fields utilized by the back-end business application. To provide the output, the process 500 may update custom data field identifier placeholders within a default GUI layout according to the custom data fields utilized by the back-end business application, may populate custom data field value placeholders within the default GUI layout according to the data values of custom data fields utilized by the back-end business application identified in the retrieved database record, and may populate common data field value placeholders within the default GUI layout according to data values of the common data fields in the retrieved database record.

As described above, the trusted call center agent has authority to access the associated back-end application, and does so using discrete data element copy/paste functionality provided by the process 500. At block 514, the process 500 provides a separate GUI copy button for each individual data element of the real-time call data. As such, a separate GUI copy button may be associated with each common data element and each custom data element of the real-time call data. A trusted call center agent selection of each separate GUI copy button allows individualized single-button copy of the associated respective data element value to a clipboard of the CTI client device. By providing a discrete and independent GUI copy button for each element of the real-time call data, the trusted call center agent may determine which data elements are propagated to the back-end business application. This isolates the back-end business application from programmatic (e.g., API-based) access. This isolation may also improve data security of business/customer records and account details that are stored in the back-end business application.

At decision point 516, the process 500 makes a determination as to whether the IVR system 104 created a URL within the real-time call data usable to access an application-level user interface of the back-end business application. In response to determining that the IVR system 104 did not create a URL within the real-time call data, the process 500 processes user interface and button selections to copy individual elements of the real-time call data to the copy buffer 120 at block 518. The processing at block 518 may include detecting an agent selection of and launching an application using a clickable URL if provided by the process 500, as described in more detail below.

It is understood that the process 500 does not operate further on the real-time call data, and in contrast it is the trusted call center agent that may utilize the individual items of real-time call data from the copy buffer 120. As such, the process 500 isolates the back-end business application from programmatic (e.g., API-based) access from the call processing technologies of the call center.

At decision point 520, the process 500 makes a determination as to whether the call has been completed. In response to determining that the call has not yet been completed, the process 500 returns to block 518 and iterates as described above to process additional button selections to copy individual elements of the real-time call data to the copy buffer 120. In response to determining that the call has been completed at decision point 520, the process 500 returns to decision point 502 and iterates as described above.

Returning to the description of decision point 516, in response to determining that the IVR system 104 did create a URL within the real-time call data, the process 500 provides a clickable URL within the data output at block 522. The process 500 may provide the clickable URL within the data output by transforming the URL identified within the data record into a hyperlink that is clickable within the data output.

At decision point 524, the process 500 makes a determination as to whether the process 500 is configured to automatically launch a URL when a URL is identified within the real-time call data. In response to determining that the process 500 is configured to automatically launch a URL when a URL is identified within the real-time call data, the process 500 automatically launches the back-end business application at block 526. For example, the process 500 may automatically launch a web browser using the identified URL to navigate to the application-level user interface of the appropriate back-end business application that is associated with the call. Again, the application-level user interface (UI) is different from an application programming interface (API) because there is no programmatic interaction between the CTI client computing device 102 and the respective back-end server. In response to either automatically launching the back-end business application at block 526, or in response to determining that the process 500 is not configured to automatically launch a URL at decision point 524, the process 500 transitions to block 518 and iterates as described above.

As such, the process 500 provides real-time data processing capabilities, with customized real-time call data output. The process 500 provides individual call data copy buttons that allow individual elements of call data to be copied to a clipboard of a CTI client device, such as the CTI client computing device 102. In this way, the process 500 isolates the data of the back-end business applications from programmatic (e.g., API-based) access by call processing devices within the call center.

As described above in association with FIG. 1 through FIG. 5, the example systems and processes provide a cross-process computer telephony integration (CTI) client. Many other variations and additional activities associated with cross-process computer telephony integration (CTI) client processing are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
by a processor of a computer telephony integration (CTI) client computing device that isolates call processing devices from each of a plurality of back-end business applications of call-center clients for which call-center services are provided within a service provider multi-tenant model by a telephone call center:
receiving, during active call processing of an incoming telephone call, a registered call event from a CTI middleware server responsive to an interactive voice response (IVR) system (i) storing real-time call data to an independent stand-alone database in association with a unique call-specific database key, and (ii) associating the unique call-specific database key with the incoming telephone call in the CTI middleware server;
retrieving the unique call-specific database key from the CTI middleware server;
retrieving a call database record comprising the real-time call data from the independent stand-alone database using the unique call-specific database key retrieved from the CTI middleware server; and
providing, as output on a user interface device, the real-time call data to a trusted call center agent that has separate authorization to access a back-end business application appropriate to continue the active call processing.

2. The computer-implemented method of claim 1, where the output is provided within a graphical user interface (GUI) that is uniquely adapted to each of the plurality of back-end applications according to different data requirements of each of the plurality of back-end applications.

3. The computer-implemented method of claim 1, further comprising:
determining from data element identifiers of the real-time call data in the retrieved call database record (i) common data fields among the plurality of back-end business applications and (ii) custom data fields utilized by the back-end business application; and
where providing, as the output on the user interface device, the real-time call data to the trusted call center agent that has separate authorization to access the back-end business application appropriate to continue the active call processing comprises:
updating custom data field identifier placeholders within a default graphical user interface (GUI) layout according to the custom data fields utilized by the back-end business application;
populating custom data field value placeholders within the default GUI layout according to data values of the custom data fields utilized by the back-end business application identified in the retrieved call database record; and
populating common data field value placeholders within the default GUI layout according to data values of the common data fields identified in the retrieved call database record.

4. The computer-implemented method of claim 1, further comprising providing a separate graphical user interface (GUI) copy button associated with each common data element and each custom data element of the real-time call data, where a trusted call center agent selection of each separate GUI copy button allows individualized single-button copy of an associated respective data element value to a clipboard of the CTI client computing device.

5. The computer-implemented method of claim 1, where receiving, during the active call processing of the incoming telephone call, the registered call event from the CTI middleware server is responsive to the processor registering with the CTI middleware server to receive the registered call event using an application programming interface (API) provided by the CTI middleware server.

6. The computer-implemented method of claim 1, further comprising generating, in response to determining that the real-time call data in the retrieved call database record comprises a uniform resource locator (URL) created by the IVR system and usable to access the appropriate back-end business application, a clickable URL within the output on the user interface device.

7. The computer-implemented method of claim 6, where the output is provided within a CTI client application interface of the CTI client computing device, and further comprising:
  determining that a configuration setting of the CTI client computing device specifies automated navigation of URLs to launch back-end business applications; and
  launching the appropriate back-end business application within a separate web browser application by navigating the clickable URL.

8. A system, comprising:
  a user interface device; and
  a processor of a computer telephony integration (CTI) client computing device that isolates call processing devices from each of a plurality of back-end business applications of call-center clients for which call-center services are provided within a service provider multi-tenant model by a telephone call center, where the processor is programmed to:
    receive, during active call processing of an incoming telephone call, a registered call event from a CTI middleware server responsive to an interactive voice response (IVR) system (i) storing real-time call data to an independent stand-alone database in association with a unique call-specific database key, and (ii) associating the unique call-specific database key with the incoming telephone call in the CTI middleware server;
    retrieve the unique call-specific database key from the CTI middleware server;
    retrieve a call database record comprising the real-time call data from the independent stand-alone database using the unique call-specific database key retrieved from the CTI middleware server; and
    provide, as output on the user interface device, the real-time call data to a trusted call center agent that has separate authorization to access a back-end business application appropriate to continue the active call processing.

9. The system of claim 8, where the output is provided within a graphical user interface (GUI) that is uniquely adapted to each of the plurality of back-end applications according to different data requirements of each of the plurality of back-end applications.

10. The system of claim 8, where the processor is further programmed to:
  determine from data element identifiers of the real-time call data in the retrieved call database record (i) common data fields among the plurality of back-end business applications and (ii) custom data fields utilized by the back-end business application; and
  where, in being programmed to provide, as the output on the user interface device, the real-time call data to the trusted call center agent that has separate authorization to access the back-end business application appropriate to continue the active call processing, the processor is programmed to:
    update custom data field identifier placeholders within a default graphical user interface (GUI) layout according to the custom data fields utilized by the back-end business application;
    populate custom data field value placeholders within the default GUI layout according to data values of the custom data fields utilized by the back-end business application identified in the retrieved call database record; and
    populate common data field value placeholders within the default GUI layout according to data values of the common data fields identified in the retrieved call database record.

11. The system of claim 8, where the processor is further programmed to provide a separate graphical user interface (GUI) copy button associated with each common data element and each custom data element of the real-time call data, where a trusted call center agent selection of each separate GUI copy button allows individualized single-button copy of an associated respective data element value to a clipboard of the CTI client computing device.

12. The system of claim 8, where the processor being programmed to receive, during the active call processing of the incoming telephone call, the registered call event from the CTI middleware server is responsive to the processor being programmed to register with the CTI middleware server to receive the registered call event using an application programming interface (API) provided by the CTI middleware server.

13. The system of claim 8, where the output is provided within a CTI client application interface of the CTI client computing device, and where the processor is further programmed to:
  generate, in response to determining that the real-time call data in the retrieved call database record comprises a uniform resource locator (URL) created by the IVR system and usable to access the appropriate back-end business application, a clickable URL within the output on the user interface device;
  determine that a configuration setting of the CTI client computing device specifies automated navigation of URLs to launch back-end business applications; and
  launch the appropriate back-end business application within a separate web browser application by navigating the clickable URL.

14. A computer program product, comprising:
  a computer readable storage medium having computer readable program code embodied therewith, where the computer readable storage medium is not a transitory signal per se and where the computer readable program code when executed on a computer implemented as a computer telephony integration (CTI) client computing device that isolates call processing devices from each of a plurality of back-end business applications of call-center clients for which call-center services are provided within a service provider multi-tenant model by a telephone call center causes the computer to:
    receive, during active call processing of an incoming telephone call, a registered call event from a CTI middleware server responsive to an interactive voice response (IVR) system (i) storing real-time call data to an independent stand-alone database in association with a unique call-specific database key, and (ii) associating the unique call-specific database key with the incoming telephone call in the CTI middleware server;
    retrieve the unique call-specific database key from the CTI middleware server;
    retrieve a call database record comprising the real-time call data from the independent stand-alone database using the unique call-specific database key retrieved from the CTI middleware server; and
    provide, as output on a user interface device, the real-time call data to a trusted call center agent that has separate authorization to access a back-end business application appropriate to continue the active call processing.

15. The computer program product of claim 14, where the output is provided within a graphical user interface (GUI) that is uniquely adapted to each of the plurality of back-end applications according to different data requirements of each of the plurality of back-end applications.

16. The computer program product of claim 14, where the computer readable program code when executed on the computer further causes the computer to:
    determine from data element identifiers of the real-time call data in the retrieved call database record (i) common data fields among the plurality of back-end business applications and (ii) custom data fields utilized by the back-end business application; and
    where, in causing the computer to provide, as the output on the user interface device, the real-time call data to the trusted call center agent that has separate authorization to access the back-end business application appropriate to continue the active call processing, the computer readable program code when executed on the computer causes the computer to:
        update custom data field identifier placeholders within a default graphical user interface (GUI) layout according to the custom data fields utilized by the back-end business application;
        populate custom data field value placeholders within the default GUI layout according to data values of the custom data fields utilized by the back-end business application identified in the retrieved call database record; and
        populate common data field value placeholders within the default GUI layout according to data values of the common data fields identified in the retrieved call database record.

17. The computer program product of claim 14, where the computer readable program code when executed on the computer further causes the computer to provide a separate graphical user interface (GUI) copy button associated with each common data element and each custom data element of the real-time call data, where a trusted call center agent selection of each separate GUI copy button allows individualized single-button copy of an associated respective data element value to a clipboard of the computer.

18. The computer program product of claim 14, where the computer readable program code causing the computer to receive, during the active call processing of the incoming telephone call, the registered call event from the CTI middleware server is responsive to the computer readable program code causing the computer to register with the CTI middleware server to receive the registered call event using an application programming interface (API) provided by the CTI middleware server.

19. The computer program product of claim 14, where the computer readable program code when executed on the computer further causes the computer to generate, in response to determining that the real-time call data in the retrieved call database record comprises a uniform resource locator (URL) created by the IVR system and usable to access the appropriate back-end business application, a clickable URL within the output on the user interface device.

20. The computer program product of claim 19, where the output is provided within a CTI client application interface of the computer, and where the computer readable program code when executed on the computer further causes the computer to:
    determine that a configuration setting of the computer specifies automated navigation of URLs to launch back-end business applications; and
    launch the appropriate back-end business application within a separate web browser application by navigating the clickable URL.

* * * * *